June 12, 1928.
C. B. MILLS
SHIP'S SIGNALING OR BROADCASTING DEVICE
Original Filed Nov. 14, 1923  3 Sheets-Sheet 1
1,673,369
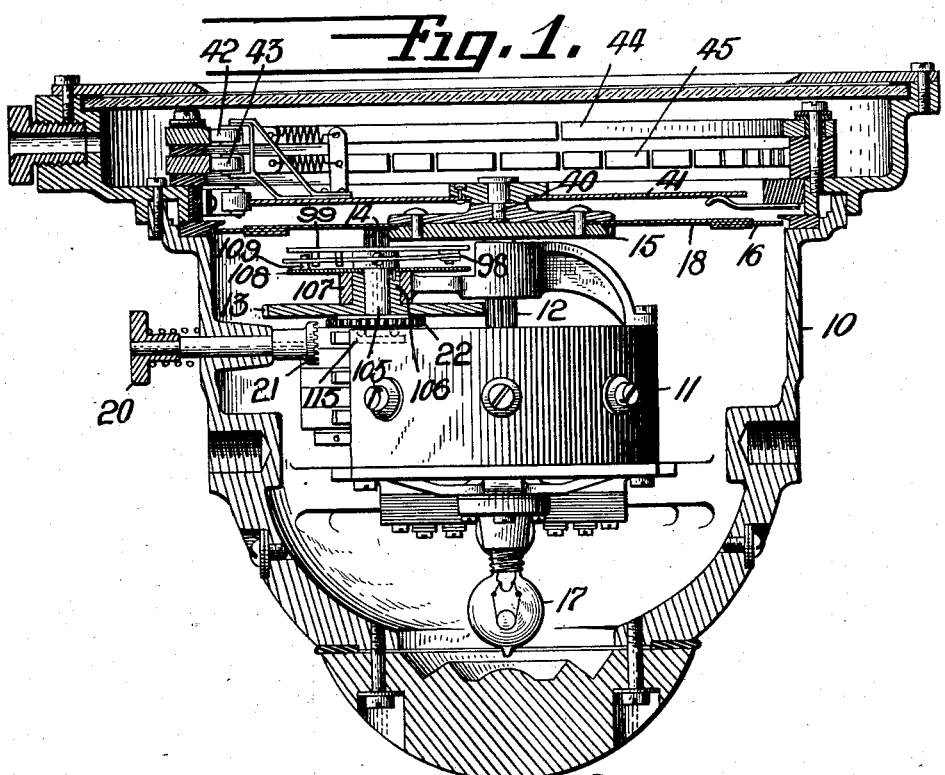
Inventor
Chester B. Mills.
By his Attorney
Herbert H. Thompson June 12, 1928.                                         1,673,369
C. B. MILLS
SHIP'S SIGNALING OR BROADCASTING DEVICE
Original Filed Nov. 14, 1923    3 Sheets-Sheet 2
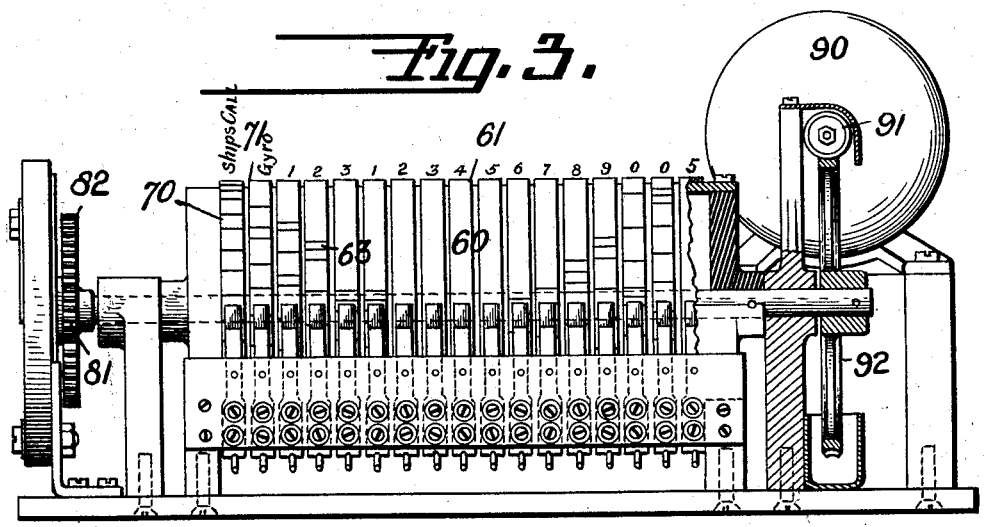
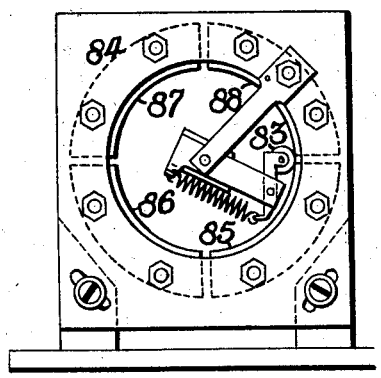
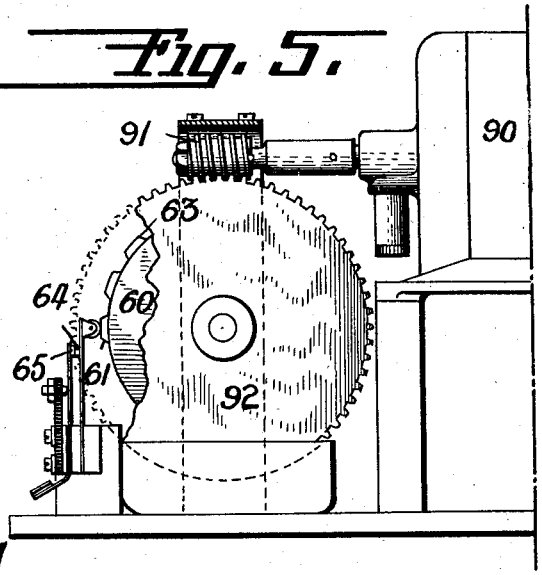
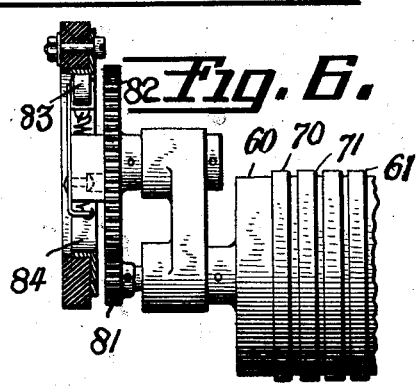
Inventor
Chester B. Mills
By his Attorney
Hubert H. Thompson June 12, 1928.
C. B. MILLS
SHIP'S SIGNALING OR BROADCASTING DEVICE
Original Filed Nov. 14, 1923  3 Sheets-Sheet 3
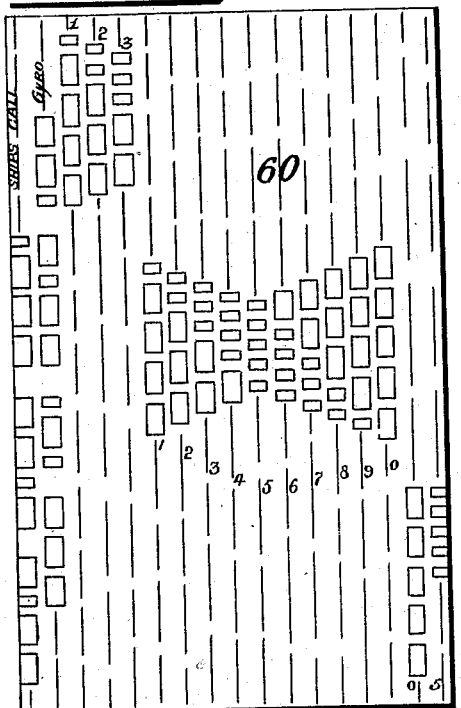
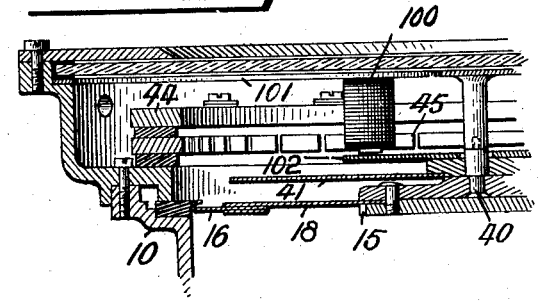
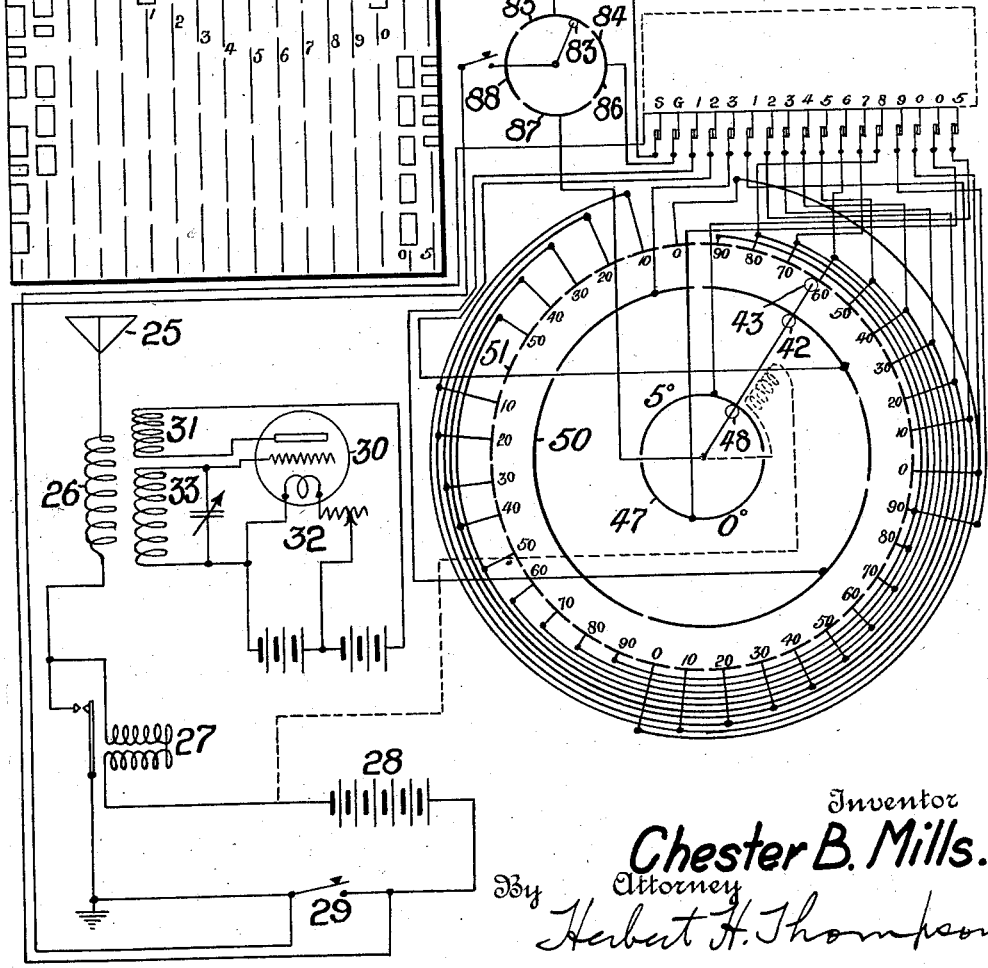
Inventor
Chester B. Mills.
By Herbert H. Thompson
Attorney Patented June 12, 1928.

1,673,369

UNITED STATES PATENT OFFICE.

CHESTER B. MILLS, OF BROOKLYN, NEW YORK, ASSIGNOR TO THE SPERRY GYROSCOPE COMPANY, OF BROOKLYN, NEW YORK, A CORPORATION OF NEW YORK.

SHIP'S SIGNALING OR BROADCASTING DEVICE.

Application filed November 14, 1923, Serial No. 674,760. Renewed July 16, 1927.

This invention relates to ship's signaling or broadcasting devices and is designed particularly for use in broadcasting the ship's course, although the invention is equally capable of use in broadcasting the ship's speed, or any other variable factor, dependent upon the ship's movements. In addition, other suitable information of a fixed or variable character may be transmitted.

The invention has for one of its objects the provision of means for periodically transmitting a signal or signals as described above, preferably by wireless means. While ships have heretofore transmitted wireless signals so that other ships may ascertain their position by means of radio direction finders, they did not transmit their course, nor were means provided for transmitting such signals automatically, and periodically to keep neighbouring vessels apprised of its heading. This invention is therefore especially desirable for use in foggy weather.

It is a further object of my invention to provide means for transmitting a signal or signals as above described, said transmission being operated from a course indicator which may be a repeater compass controlled by a master gyro compass, or may be set by hand.

It is a further object of this invention to transmit clear distinct signals of the type described without break or interruption even when the ship is changing its course. For this purpose I provide means for preventing response of the signal-controlling means to changes in course while a signal is being transmitted, but permitting said controlling means to be operated into synchronism with the master compass as soon as the transmission of the signal has been completed.

It is a further object of my invention to provide a small, compact and very simple signal transmission device for accomplishing the above mentioned objects.

Other objects and advantages of this invention will become apparent from the detailed specification, taken in connection with the accompanying drawings.

In the drawings,

Fig. 1 is a vertical section through a repeater compass employed in connection with a Sperry gyro-compass, and having a part of my invention applied thereto.

Fig. 2 is a plan view, with parts broken away, of the Fig. 1 device.

Fig. 3 is a front elevation, partly sectioned vertically, of a circuit closing device and a selector mechanism therefor.

Fig. 4 is an end view of the device shown in Fig. 3 and illustrating the selector for controlling the circuit closer of Fig. 3.

Fig. 5 is an end view, partly sectioned and with parts broken away, of the Fig. 3 device showing the driving mechanism for the circuit closing device.

Fig. 6 is an enlarged front view, partly sectioned and with parts broken away, showing the gearing connection between the selector mechanism and the circuit closing device of Figs. 3 and 4.

Fig. 7 is a view of the contact carrying cylinder of the circuit closing device unrolled or developed.

Fig. 8 is a vertical section through a portion of a repeater compass showing means applied thereto for preventing interruption of a signal transmission.

Fig. 9 is a wiring diagram.

As hereinbefore stated, the particular variable factor which it is desired to broadcast in the present case is the ship's course. It is therefore necessary to provide in the first place a course indicating mechanism. For this purpose there is employed a repeater compass shown in Figs. 1 and 2 and adapted to be operated from a transmitter on a master compass, preferably a gyroscopic compass of the Sperry type. The repeater compass is an automatic course-responsive device but my invention is applicable also to a hand-set course indicator. Said repeater compass comprises a casing 10 within which is fixedly mounted a repeater motor 11 adapted to be driven from the transmitter of the master compass, usually at a much higher speed. The rotation of the repeater motor is stepped down through gearing 12, 13, 14, 15, so that a compass card 16 mounted to move integrally with gear 15 rotates in synchronism with the compass card of the master compass, that is in a ratio of one to one. Said card 16 may be of a translucent material and a source of illumination 17 may be provided within the repeater compass casing beneath the card to illuminate the numerals upon said card.

If desired, the translucent portion of card 16 may form merely the outer rim which may be fixed to a plate 18 of metal or other suitable material, as shown. The usual spring-pressed knob 20 may be provided which, when pressed inwardly, causes crown gear 21 to engage a gear 22 movable integrally with gear 13 to permit setting of the repeater compass in synchronism with the master compass.

The present invention contemplates the use of wireless signals and for this purpose there is shown in Fig. 9, one suitable form of regenerative oscillatory transmitting circuit, although it will be understood that many other forms can be employed. The transmitting system shown comprises an antenna 25, the antenna circuit including a coil 26, a buzzer 27, a source of current 28, and a switch 29, and a three electrode bulb 30 having a plate circuit 31, a filament circuit 32 and a grid circuit 33. Depending upon the length of time that the antenna circuit is energized, there will be transmitted a long or short signal corresponding to the dots and dashes of the telegraphic code. For controlling the sending of signals through the circuit hereinbefore described, there is provided the following mechanism in the antenna circuit:

A shaft 40 movable integrally with the repeater card has connected thereto a metallic plate 41 on which is mounted a plurality of spring pressed brushes 42, 43 adapted to engage commutators 44, 45, as the card rotates. From gear 13 there is adapted to be rotated by means of gear 46 a commutator 47 with which cooperates a brush 48, the gearing being such that commutator 47 is rotated 36 times for each complete revolution of the repeater card. It will be observed that the commutators 44 and 45 are fixed, while commutator 47 is movable, but that brushes 42 and 43 are rotatable relative to their respective commutators, while the brush 48 is fixed. The commutator 44 is suitably subdivided so that each subdivision corresponds to a hundred degrees. Commutator 45 is suitably subdivided so that each subdivision corresponds to ten degrees, while commutator 47 is subdivided into two five degree divisions. Commutator 44 is therefore divided into four portions, the first being a silent portion and corresponding to the transmission of signals of less than 100 degrees. The second portion is adapted to transmit a signal corresponding to 100 degrees, the third portion to 200 degrees and the fourth portion to 300 degrees. Commutator 45 is subdivided into 36 portions in three groups ranging from zero degrees to 90 degrees and a fourth group from zero degrees to 50 degrees, each portion corresponding to 10 degrees. Like contacts in each of the aforesaid groups are connected in parallel so that the same contact of each group will send out the same signal, that is to say 20 degrees in one group will actuate the same signal as 20 degrees in any of the other groups. Commutator 47 is divided into two parts, the first corresponding to zero degrees and the second to 5 degrees, this being the desired limit of accuracy of the transmitted course.

Referring to Fig. 9 it will be observed that the silent portion 50 of the commutator 44 corresponds to portions from zero through 90 of the commutator 45. This portion 50 it will be observed is therefore not connected to the wireless transmitting circuit, so that in this portion of the azimuth scale, brush 42 is ineffective. Beyond the first hundred degrees of the azimuth scale however, both brushes 42 and 43 are effective to transmit both hundreds and tens. The brush 48 is always effective, since this is the units scale. It will be observed further, that the first contact 51 of the commutator 45 is also silent since within the first ten degrees of the azimuth scale there is no necessity to transmit a tens designation and hence only brush 48 is effective to transmit zero or 5 degrees as the case may be. Further while brush 43 is on the first half of each tens contact brush 48 is on the zero units contact, and while brush 43 is on the east half of each tens contact brush 48 is on the 5° contact.

To enable the brushes 42, 43 and 48 in contact with their commutators 44, 45 and 47 respectively, to transmit suitable signals through the wireless sending instrument, there is provided a circuit closer in the form of a roller or cylinder 60 having a plurality of parallel, peripheral projecting rims 61, on the surface of which is formed long and short projections 63 as the case may be, corresponding to the dashes and dots of the telegraphic code, which as the roller or cylinder 60 rotates are adapted to engage spring contacts 64 (see Fig. 5), one of which is provided to cooperate with each rim 61. When a projection 63 engages a contact 64, the latter engages a contact 65 to close the circuit through the transmission system to send a long or short signal as the case may be. The entire course is adapted to be transmitted in one revolution of the contact carrying cylinder, so that it is necessary to position the signals corresponding to hundreds in advance of the signals corresponding to tens which are in turn positioned in advance of the signals corresponding to units within a single circumference (see Fig. 7). Since only one of the hundreds, one of the tens and one of the unit commutator segments can be in engagement with their respective brushes at any one time, only one of the hundreds designations, one of the tens designations and one of the units designations can be transmitted in succession in any single rotation of the contact carrying cylinder 60. It will be understood of course that if the course in azimuth is less than 100 degrees, brush 42 is ineffective, none of the hundreds designations will be transmitted and the signal transmitted will be only tens and units. Similarly if the course in azimuth is less than ten degrees, both brushes 42 and 43 will be on the respective dead portions 50 and 51, and hence only units designations will be transmitted.

I contemplate employing my invention for sending out other information in addition to the course. Such information may be of a variable character, such as the speed of the ship, or of a fixed character, such as the ship's call. In the present case I contemplate sending out the ship's call to apprise other vessels of the ship's name, the word "gyro" to indicate the type of navigating instrument employed, as well as the course of the vessel. In order to send the ship's call, I provide on the contact carrying cylinder 60 an additional rim 70 having suitable long and short projections thereon as shown in the first line of projections in Fig. 7, I provide a second rim 71 having suitable projections shown in the second line from the left of Fig. 7 to transmit the word "gyro" to indicate the type of sending instrument. It is apparent that upon each rotation of the contact carrying cylinder 60, there would ordinarily be transmitted at substantially the same time the ship's call, the word "gyro" and the course, which would be undesirable. I therefore provide means whereby these signals may be transmitted successively. This could of course be done by providing a cylinder large enough so that the contacts corresponding to the various signals could be positioned successively around the cylinder, so that the signals would be transmitted successively in one revolution of the cylinder 60. This however would necessitate a cylinder of an exceptionally large diameter. To permit a small diameter cylinder to be employed, I provide means whereby one of said signals is transmitted for each complete rotation of the contact carrying cylinder, suitable selector mechanism being interposed to render said signal carrying rims successively effective on successive rotations of said cylinder. For this purpose the contact cylinder 60 is geared through reduction gearing 81, 82 to a brush 83 in engagement with a commutator 84, so that the brush 83 rotates once for every four revolutions of the contact carrying cylinder. Brush 83 and selector 84 are interposed in the line between the circuit closing device and the wireless transmitting apparatus. The selector 84 is divided in this case into four sections 85, 86, 87 and 88.

Referring now to Fig. 9, it will be observed that when brush 83 is in engagement with segment 85, the first signal is effective, that is, the circuit to the wireless transmitting apparatus lies from the first rim 70 of the contact carrying cylinder through segment 85 and brush 83 to the wireless transmitting apparatus. The contacts 64, 65 actuated by all of the other rims on the contact carrying cylinder are dead. Since the gearing is four to one, the brush 83 will remain in engagement with segment 85 for one complete revolution of the contact carrying cylinder. During this revolution the signal corresponding to the ship's call is transmitted. As the cylinder begins its second rotation, brush 83 moves into engagement with segment 86 of the selector to render the contacts 64, 65 actuated by the projections on the second rim 71 of the cylinder effective, so that during the next revolution of the cylinder 60 only the word "gyro" is transmitted. Similarly in the next revolution, brush 83 is in engagement with segment 87 to energize the circuit through the contacts 64, 65 actuated by the projections on the remaining rims by way of brushes 42, 43 and 48 and their cooperating contacts so that in the next revolution of cylinder 60, the course will be transmitted in hundreds, tens and units, successively in one revolution of cylinder 60. During the next revolution of the cylinder 60 brush 83 is in engagement with a dead segment 88 so that there will be a period of silence throughout one revolution of the cylinder 60 before the series of signals is again transmitted.

While three signals have been included in the set as described above, that is, the ship's call, the word "gyro" and the course, it will be understood that any other information of a fixed or variable character may be substituted for these signals or transmitted in addition thereto, in the latter case extra rims with suitable projections being provided and the commutator 84 of the selector mechanism being subdivided into a suitable number of parts. The reduction gearing 81, 82 would be suitably proportioned so that one revolution of the cylinder corresponded to the engagement of brush 83 with one segment of the commutator.

It will be apparent that my invention can be employed in connection with a course-indicator that does not automatically respond to changes in course but is settable by hand. Thus, the course could be set by operating knob 20, in which case brushes 42, 43 and 48 would be actuated as before.

It will be understood that cylinder 60 is rotated continuously by means such as a motor 90 connected by gearing 91, 92 to said cylinder.

To prevent stoppage of the brushes on a dead space between adjacent contacts 44, 45, 47 the plate 41 may be provided on its periphery with pointed projections 93 placed every 5° to form grooves 94 with which cooperates a spring pressed detent 95. Said plate 41 is driven from gear 14 which is in turn driven from gear 13 through a yielding resilient connection.

Such connection may comprise a hair-pin spring 98 fixed to a plate 99 carried by the shaft 105 to which is fixed the gear 14. Said shaft 105 extends freely through a cylindrical hub 106 which carries gears 13 and 22, said hub being journaled in fixed bearing 107. Upward movement of shaft 105 through the gears and said hub may be prevented in any suitable manner as by providing a flange 115 on the lower end of said shaft, said flange having frictionless engagement with the under surface of gear 22 by means of ball-bearings. Said hub carries at its upper end a plate 108 to which is fixed a pin 109 positioned between and engaged by the ends of the hair-pin spring 98. A pin 110 fixed to the plate 99 is also positioned between and engaged by the ends of the hair-pin spring. The drive from the repeater motor is therefore through pin 109 engaging one arm or the other of the spring, to cause said spring to engage pin 110 to drive plate 41. When, however, the plate 41 is held by the engagement of detent 95 with projections 93, the respective arm of spring 98 under tension will yield, thus permitting relative movement of gear 13 to gear 14. The degree of yielding of the spring arms may be limited by stop pins 112.

When the brush 48 reaches the end of either of the 5° contacts of commutator 47 and is about to pass over the dead space prior to engaging the next contact, or when simultaneously brush 42 or 43 passes over the dead space between corresponding contacts, the projections 93 are so positioned that detent 95 will hold plate 41 back for a short period during which energy is being stored in spring 98 due to the continuous rotation of gear 13 (driven by the repeater motor) and the lag of plate 41. This stored energy in spring 98 will after a short time be sufficient to snap the respective projection 93 past detent 95 and so carry the brush or brushes, as the case may be, rapidly over the dead space between adjacent contacts into engagement with the next contact.

It is apparent that the transmission of a set of signals will require a given time and it is possible that during this time the ship may change its course, if course is the variable factor which is being transmitted, as in this case, in which case the signal will become confused, since different designations will be rendered live in the midst of a transmission. To prevent interruption of the transmission of a signal until said signal is completed, even though the ship changes its course in the meantime, there may be provided a retarding means in the form of a solenoid 100 supported from the casing by a spider 101 adapted to engage a metallic plate 102, movable integrally with plate 41, whenever the course sending mechanism becomes operative. In the present case this would take place when brush 83 engages segment 87, in which case, the circuit through electromagnet 100 would be closed to cause said magnet to attract plate 102 and thus prevent movement of plate 41 so that movement of the brushes relative to their contacts would be impossible as long as said electromagnet was energized. If the course is changed while said electromagnet is energized, the plate 41 and the brushes would be held fixed until the signal was completed, whereupon the magnet 100 would be deenergized and the energy stored in spring 98 due to the relative movement of gear 13 to gear 14 would cause the plate 41 and the brushes carried thereby to swing rapidly into synchronism with the master compass. There is no need to render the electromagnet 100 effective while the ship's call or the word "gyro" or any other fixed information is being transmitted, since said signals are not dependent upon change in course.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having herein described my invention what I claim and desire to secure by Letters Patent is, 1. In a signaling apparatus, a wireless transmitting circuit, a member having a plurality of means adapted to energize said circuit substantially simultaneously, an indicating device, and means whereby said indicating device selectively renders said means effective.

2. In a signaling apparatus, a wireless transmitting circuit, a rotary member having a plurality of means adapted to energize said circuit substantially simultaneously, an indicating device, and means whereby said indicating device selectively renders said means effective.

3. In combination with a dirigible craft, a signaling apparatus including a wireless transmitting circuit, a member having a plurality of means adapted to energize said circuit substantially simultaneously, course responsive means, and means whereby said course responsive means selectively renders said first means effective.

4. In combination with a dirigible craft, a signaling apparatus including a wireless transmitting circuit, a rotary member having a plurality of means adapted to energize said circuit substantially simultaneously, course responsive means, and means whereby said course responsive means selectively renders said first means effective.

5. In combination with a dirigible craft, a signaling apparatus including a wireless transmitting circuit, a circuit closing device having a plurality of means for energizing said transmitting circuit substantially simultaneously, an indicating device, and means whereby said indicating device selectively renders said means effective.

6. In combination with a dirigible craft, a signaling apparatus including a wireless transmitting circuit, a circuit closing device having a plurality of means for energizing said transmitting circuit substantially simultaneously, a course responsive device, and means whereby said course responsive device selectively renders said means effective to transmit a signal corresponding to the course.

7. In combination with a dirigible craft, a signaling apparatus including a wireless transmitting circuit, a rotary circuit closing device having a plurality of means for energizing said transmitting circuit substantially simultaneously, an indicating device, and means whereby said indicating device selectively renders said means effective.

8. In combination with a dirigible craft, a signaling apparatus including a wireless transmitting circuit, a rotary circuit closing device having a plurality of means for energizing said transmitting circuit substantially simultaneously, an indicating device, means whereby said indicating device selectively renders said means effective, and means for rotating said device continuously to transmit said signal periodically.

9. In combination with a dirigible craft, a signaling apparatus including a wireless transmitting circuit, a circuit closing device having a plurality of sets of means adapted to energize said transmitting circuit substantially simultaneously, course responsive means, and means whereby said course responsive means selectively renders the means in each set effective.

10. In combination with a dirigible craft, a signaling apparatus including a wireless transmitting circuit, a circuit closing device having a plurality of sets of means adapted to energize said transmitting circuit substantially simultaneously, the means in one set being adapted to transmit "hundreds" signals, the means in the second set "tens" signals, and the means in the third set "units" signals, course responsive means, and means whereby said course responsive means selectively renders the means in each set effective corresponding to the course of the craft in azimuth.

11. In combination with a dirigible craft, a signaling apparatus including a wireless transmitting circuit, a rotary circuit closing device having a plurality of sets of means adapted to energize said transmitting circuit substantially simultaneously, the means in one set being adapted to transmit "hundreds" signals, the means in the second set "tens" signals and the means in the third set "units" signals, said sets being successively positioned within one circumference of said device, course responsive means and means whereby said course responsive means selectively renders the means in each set effective corresponding to the course of the craft in azimuth.

12. In combination with a dirigible craft, a signaling apparatus including a wireless transmitting circuit, a rotary circuit closing device having a plurality of sets of means adapted to energize said transmitting circuit substantially simultaneously, the means in one set being adapted to transmit "hundreds" signals, the means in the second set "tens" signals and the means in the third set "units" signals, said sets being successively positioned within one circumference of said device, course responsive means, means whereby said course responsive means selectively renders the means in each set effective corresponding to the course of the craft in azimuth, and means for rotating said device continuously to transmit the course periodically.

13. In combination with a dirigible craft, a signaling apparatus including a wireless transmitting circuit, a rotary circuit closing device having a plurality of sets of circuit closing means, each set being adapted to transmit a signal once in each revolution of said device, and means for selectively rendering one set effectively in each revolution of said device.

14. In combination with a dirigible craft, a signaling apparatus including a wireless transmitting circuit, a rotary circuit closing device having a plurality of sets of circuit closing means, each set being adapted to transmit a signal once in each revolution of said device, and means for selectively rendering said sets effective successively, one set in each revolution of said device.

15. In combination with a dirigible craft, a signaling apparatus including a wireless transmitting circuit, a rotary circuit closing device having a plurality of sets of circuit closing means, each set being adapted to transmit a signal once in each revolution of said device, and means for selectively rendering said sets effective successfully, one or more of said sets in each revolution of said device.

16. In combination with a dirigible craft, a signaling apparatus including a wireless transmitting circuit, a rotary circuit closing device having a plurality of sets of circuit closing means, each set being adapted to transmit a signal once in each revolution of said device, and means for selectively rendering one or more sets effective in each revolution of said device.

17. In combination with a dirigible craft, a signaling apparatus including a wireless transmitting circuit, a rotary circuit closing device having a plurality of sets of circuit closing means, each set being adapted to transmit a signal once in each revolution of said device, a selector for selectively rendering one set effective in each revolution of said device, said selector comprising a fixed member and a relatively movable member, said fixed member comprising a plurality of parts, each of said sets being connected to one of said parts and means whereby said movable member is in engagement with each part throughout one revolution of said device.

18. In combination with a dirigible craft, a signaling apparatus including a wireless transmitting circuit, a rotary circuit closing device having a plurality of sets of circuit closing means, each set being adapted to transmit a signal once in each revolution of said device, a selector for selectively rendering one set effective in each revolution of said device, said selector comprising a fixed member and a relatively movable member, said fixed member comprising a plurality of parts, each of said sets being connected to one of said parts and means whereby said movable member is in engagement with each part throughout one revolution of said device, and means for rotating said device continuously to transmit said set of signals periodically.

19. In a signaling apparatus, means for transmitting a signal, means responsive to a variable factor controlling said first means, and means for preventing response of said second means to variations in said factor until the transmission of the signal has been completed.

20. In combination with a dirigible craft, a signaling apparatus comprising means for transmitting a signal, means responsive to changes in the course of the craft for controlling said first means and means for preventing response of said second means to changes in course of the craft until the transmission of the signal has been completed.

21. In combination with a dirigible craft, a signaling apparatus comprising means for transmitting a signal, means responsive to changes in course of the craft, and means rendered effective when said first means is operating for preventing response of said second means to changes in course of the craft.

22. In combination with a dirigible craft, a signal apparatus comprising means for transmitting a signal, means responsive to changes in the course of the craft for controlling said first means, means yieldably connected to said second means and movable therewith for controlling said first means, and means for preventing said last named means from moving together with said second means until the transmission of the signal has been completed.

23. In combination with a dirigible craft, a signaling apparatus comprising means for transmitting a signal, means responsive to changes in the course of the craft, means yieldably and resiliently connected to said second means and movable therewith for controlling said first means and means for preventing said last named means from moving together with said second means until the transmission of the signal has been completed, the resilient connection between said second and third means serving to restore said third means to its initial position relative to said second means when the transmission of the signal has been completed.

24. In combination with a dirigible craft, a signaling apparatus comprising means for transmitting a signal, means responsive to changes in the course of the craft, means yieldably and resiliently connected to said second means and movable therewith for controlling said first means and means including an electro-magnet rendered effective when said first means is operating for preventing said last named means from moving together with said second means, the resilient connection between said second and third means serving to restore said third means to its initial position relative to said second means when said electro-magnet is deenergized.

25. In a control system, an electric circuit, means for controlling said circuit, including a plurality of spaced contacts, a brush, means for moving said brush over said contacts, and means for preventing stoppage of said brush in the spaces between adjacent contacts.

26. In a control system, an electric circuit, means for controlling said circuit, including a plurality of spaced contacts, a brush, means for moving said brush over said contacts, means for preventing stoppage of said brush in the spaces between adjacent contacts, said last named means including means for retarding movement of said brush to a predetermined extent when near the end of a contact, means whereby said retardation stores energy in said brush-moving means to overcome said retarding means and move said brush into engagement with the next adjacent contact.

27. In combination with a dirigible craft, a signaling system including a wireless circuit, means responsive to changes in course of the craft, means for controlling said circuit including a plurality of spaced contacts, a brush connected to said first means and movable over said contacts, and means for preventing stoppage of said brush in the spaces between adjacent contacts.

28. In combination with a dirigible craft, a signaling system including a wireless circuit, means responsive to changes in course of the craft, means for controlling said circuit including a plurality of spaced contacts, a brush connected to said first means and movable over said contacts, means for preventing stoppage of said brush in the spaces between adjacent contacts, said last named means including a yieldable and resilient connection between said first and second means, means for retarding the movement of said brush to a predetermined degree at the end of the contact, said retardation serving to store energy in said resilient connection to overcome said retarding means and move said brush into engagement with the next adjacent contact.

29. In combination with a dirigible craft, a signaling system including a wireless circuit, means responsive to changes in course of the craft and movable to a plurality of positions, means whereby said first means energizes said circuit in each of said positions to transmit a signal, and means for preventing stoppage of said course responsive means between signal actuating positions.

In testimony whereof I have affixed my signature.

CHESTER B. MILLS.